(12) United States Patent
Hering et al.

(10) Patent No.: US 11,150,128 B2
(45) Date of Patent: Oct. 19, 2021

(54) PIEZOELECTRIC FILM HAVING ELECTRICAL FILTER FOR SELECTIVELY DETECTING VIBRATIONS IN COMPONENTS

(71) Applicant: Schaeffler Technologies AG & Co. KG, Herzogenaurach (DE)

(72) Inventors: Joachim Hering, Würzburg (DE); Hans-Willi Kessler, Langerwehe (DE); Martin Kram, Gerolzhofen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 184 days.

(21) Appl. No.: 16/477,248

(22) PCT Filed: Dec. 18, 2017

(86) PCT No.: PCT/DE2017/101081
§ 371 (c)(1),
(2) Date: Jul. 11, 2019

(87) PCT Pub. No.: WO2018/130240
PCT Pub. Date: Jul. 19, 2018

(65) Prior Publication Data
US 2019/0353515 A1    Nov. 21, 2019

(30) Foreign Application Priority Data

Jan. 13, 2017 (DE) .................... 10 2017 100 573.0

(51) Int. Cl.
*G01H 11/08* (2006.01)
*G01H 1/00* (2006.01)

(52) U.S. Cl.
CPC .............. *G01H 11/08* (2013.01); *G01H 1/00* (2013.01)

(58) Field of Classification Search
CPC ................................ G01H 11/08; G01H 11/00
See application file for complete search history.

(56) References Cited

U.S. PATENT DOCUMENTS 6,076,405 A     6/2000  Schoess
6,510,738 B1    1/2003  Lee et al.
(Continued)

FOREIGN PATENT DOCUMENTS

CN      101014938         8/2007
DE      19618498 A1      11/1997
(Continued)

OTHER PUBLICATIONS

Sarker, Mahidur R.et al., 'Designing a Low Voltage Energy Harvesting Interface Circuit Utilizing Piezoelectric Vibration Transducer', Advances in Electrical, Electrionic and Systems Engineering (ICAEES), International Conference on. IEEE, Nov. 14, 2016, 206. S. 495-499.

(Continued)

*Primary Examiner* — Suman K Nath

(57) ABSTRACT

A detector arrangement, for selective detection of vibrations on a component, comprises a film fitted with at least one piezoelectric element. The film is attached to the component in such a way that occurring mechanical vibrations act on the piezoelectric element, such that an electrical charge with a frequency correlating with the mechanical vibration is generated at the connection electrodes of the piezoelectric element. An electrical filter is connected to the piezoelectric element and filters out the component of the supplied charge which corresponds to a predefined frequency. An electrical charge storage means which is connected to the filter is used to accumulate the filtered-out charge components. A signaling means is also provided, which generates an electrical (Continued)

signal as soon as a predetermined charge limit value is reached on the charge storage means.

19 Claims, 1 Drawing Sheet

(56) References Cited

U.S. PATENT DOCUMENTS

| | | | |
|---|---|---|---|
| 7,117,742 | B2 | 10/2006 | Kim |
| 7,554,422 | B2* | 6/2009 | Nakatsuka ............... H03H 3/02 |
| | | | 333/133 |
| 7,927,292 | B2 | 4/2011 | Brown |
| 2009/0160891 | A1* | 6/2009 | Ishizaki ............... B41J 2/04581 |
| | | | 347/10 |
| 2011/0060535 | A1 | 3/2011 | Arms et al. |
| 2013/0066594 | A1 | 3/2013 | Ludlow et al. |
| 2015/0198966 | A1* | 7/2015 | Lee ........................ G06F 1/324 |
| | | | 713/501 |
| 2016/0157734 | A1 | 6/2016 | Sullivan et al. |

FOREIGN PATENT DOCUMENTS

| | | |
|---|---|---|
| DE | 69525629 T2 | 8/2002 |
| DE | 112009004421 T5 | 6/2012 |
| DE | 102012214229 A1 | 2/2014 |
| JP | 2015014535 A | 1/2015 |
| KR | 20070021325 A1 | 2/2007 |

OTHER PUBLICATIONS

Ahu, Jian Lin et al., 'Monitoring Mechanical Vibration Amplitude System Design Based on the PVDF Piezoelectic Film Sensor', Applied Mechanics and Materials. Trans Tech Publications, May 23, 2014, S 2110-2113.

* cited by examiner

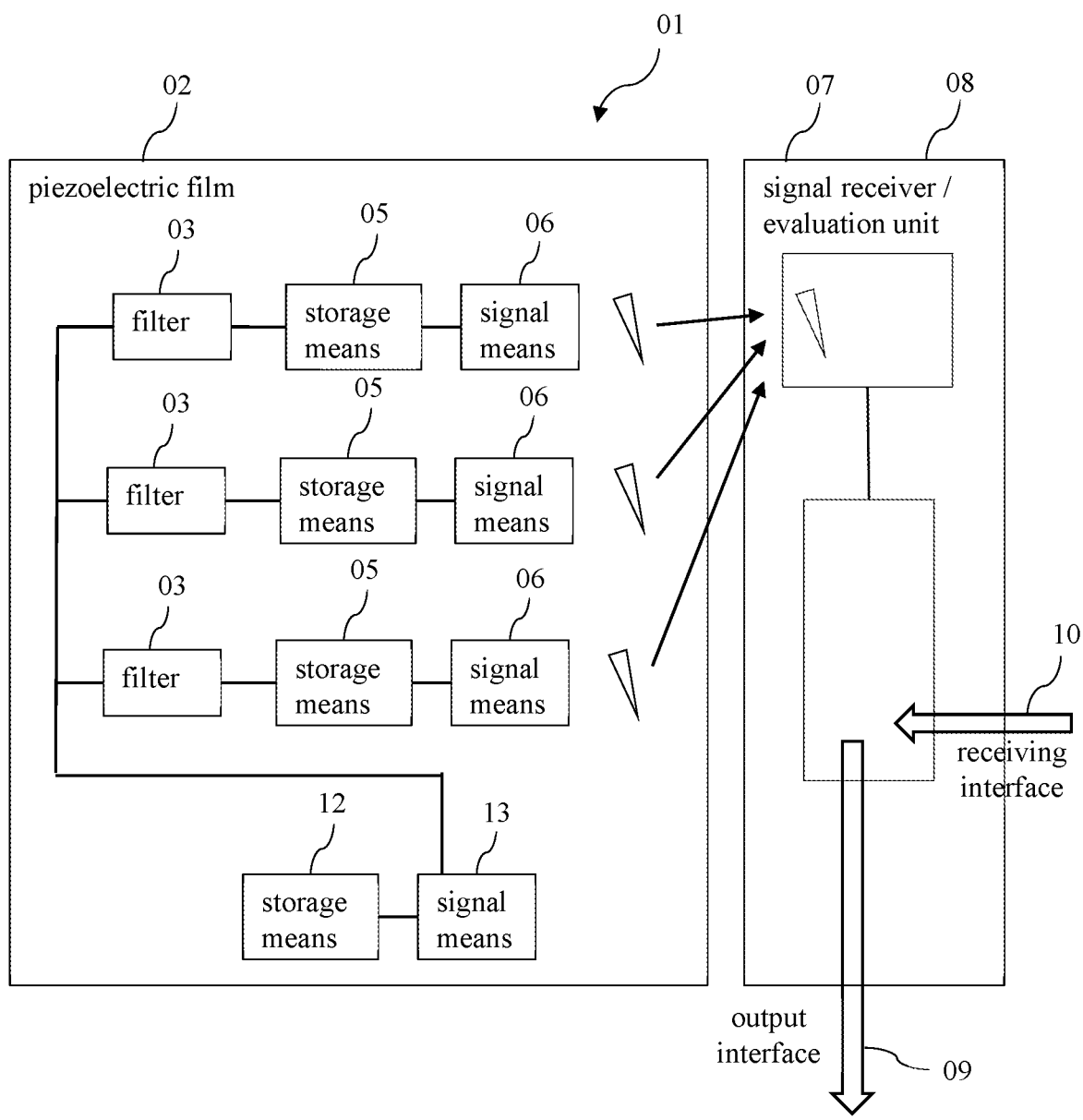

PIEZOELECTRIC FILM HAVING ELECTRICAL FILTER FOR SELECTIVELY DETECTING VIBRATIONS IN COMPONENTS

CROSS-REFERENCE TO RELATED APPLICATIONS

This application is the U.S. National Phase of PCT Appln. No. PCT/DE2017/101081 filed Dec. 18, 2017, which claims priority to DE102017100573 filed Jan. 13, 2017, the entire disclosures of which are incorporated by reference herein.

TECHNICAL FIELD

The disclosure relates to a detector arrangement which allows vibrations to be measured on fixed or rotating components, in particular on machine elements, while taking account of frequency. The detector arrangement makes use of a piezoelectric film or a film which has been coated with a piezoelectric material.

BACKGROUND

Quite generally, vibrations are repeated temporal variations of state variables of a system. In a special case the system is a machine or a component of a machine. The system can be intentionally set into vibration if the aim is to use the vibration function in a specific manner, such as in the case of orbital sanders or vibrating conveyors. In many applications, however, vibrations are only normal and tolerable for the system within a prescribed range or up to a certain intensity. Vibration values which lie outside component or application-specific limits are usually classified as damaging or even an indication of wear or damage incurred, which if they persist can cause the failure of a component or a machine. It is therefore highly important to detect vibrations on the component or the machine so that the data collected can be used, for example, to design the operation of the machine reliably and even to predict the failure of machine parts.

From the prior art various types of apparatus are known which determine the vibrations of machines and components from the input variables distance, velocity, or acceleration. Apparatuses for vibration measurement are based, for example, on eddy-current methods, optical measurement methods, inductive, piezoresistive and piezoelectric measurement procedures. The implementation of piezoelectric measurement procedures requires the use of piezoelectrically active materials. In addition to ceramics, crystals and semiconductor technologies with coated silicon surfaces are also known to the person skilled in the art as suitable materials. A material which also exhibits piezoelectric properties is polyvinylidene fluoride (PVDF). PVDF is a thermoplastic material, which is processed using injection molding to make molded parts or by extrusion into films. By means of the polarization during the processing, PVDF exhibits piezoelectric properties to a usable level. It thus belongs to the knowledge of the art that injection molded parts in the form of PVDF films exhibit piezoelectric properties, which is why they are used in different areas, for example, as sensors, especially if the available installation space is limited.

DE 10 2012 214 229 A1 teaches a geared machine with a force sensor in the form of a piezo film. The piezo film is attached to a bearing body and designed to record the forces acting on the gear wheels. An electrical cable connects the piezoelectric film to an evaluation unit. A disadvantage is that because of its structure, the sensor cannot be used on rotating components.

The person skilled in the art is also aware that vibrations can be characterized by their frequencies, which occur in different frequency ranges. For example, on the basis of a periodic rotational excitation, damage occurring to a rotating component at a frequency of a signal produces a signal of a different frequency than on the undamaged rotating component. With frequency modification an analysis of limited frequency ranges is possible. Electrical circuits which allow electrical signals of a defined frequency range to pass almost unattenuated are known to the person skilled in the art. Such circuits are used as frequency-dependent filters and are available as high-pass, low-pass and band-pass elements.

In particular with regard to a regular or permanent acquisition of the component or machine condition, known vibration measurement systems currently do not offer a satisfactory solution for all application areas. Due to a lack of data, any data analysis is often incomplete. Any conclusions as to the future condition are difficult to make. Vibration measurement systems that satisfy the requirements of condition monitoring are expensive. Another disadvantage is that they usually do not function properly without an external power supply in order to implement the signal reception and transmission, in particular since the analysis of signals, e.g. by FFT analysis, consumes a lot of energy.

SUMMARY

The object of the present disclosure is to provide an improved detector arrangement for selectively detecting vibrations on a component, which is capable of continuously recording measurement data and supplying itself with power as an autonomous system. A further object is to achieve a widespread use of such detectors in different applications even where there is little available space, for which a lower manufacturing price is also a crucial feature. The detector should also be particularly simple in design.

The detector arrangement is used for selectively detecting vibrations on a component, in particular on a part of a machine or the like. The detector arrangement will preferably be used for detecting the vibrations of roller bearings. To achieve this the detector arrangement comprises a piezoelectric film, an electrical filter, a charge storage means and a signaling means.

The piezoelectric film is equipped with at least one piezoelectric element, which is preferably an integral part of the film. Such piezoelectric films are generally known to the person skilled in the art, so that their structure need not be described in detail. The film equipped with the piezoelectric element is dimensioned in such a way that it has sufficient sensitivity to the expected vibrations. The film is applied to the component in such a way that the mechanical vibrations that occur act on the piezoelectric element. Due to the chosen arrangement of the film, energy is provided to the system so that an electrical charge with a frequency correlating with the mechanical vibration is generated at the connection electrodes of the piezoelectric element as soon as the vibration occurs. This does not require an external power supply. It proves advantageous to attach the film to the component over a sufficiently large surface area, for example, by gluing the film onto the component. Preferably, the surface area of the film is designed according to the expected frequency and intensity in such a way that sufficient power is available for the detector.

The electrical filter is used to filter out a charge component from the charge provided by the piezoelectric element. For this purpose the electrical filter is connected to the piezoelectric unit. The charge component that can be filtered out has a predefined frequency or frequency range, which correlates with the observed vibration. Thus it is also possible to determine raw signal components and envelope signal components, for example, in the same frequency ranges at the same time. The comparison of these different signal processing methods provides valuable information about the nature of a frequency excitation (e.g. pulsed or sinusoidal) and thus to the type of possible damage.

Where the text which follows only refers to frequencies, this also includes the consideration of a more or less broad frequency range, which can be selected according to the specific application.

In a very simple application case, for example, only the frequency range from 0 to 1 kHz in the raw signal is filtered out and this signal is evaluated. The high-frequency frequency components are used to supply energy for the system. In another application, it is conceivable that a plurality of frequency ranges are considered in parallel. Such an application example is present when the objective is to separate simple pulsed excitations (e.g. as a result of an imbalance) from mounting and gearing excitations. In this case it may then be necessary to use a separate piezoelectric film as a pure energy generator or to use an external power source, because under certain circumstances the energy in the remaining frequency ranges is no longer sufficient for the operation of the detector.

The filter can also be designed as a combination of simple filters, for example, to form the envelope using a high-pass, a rectifier and a low-pass. The filter can be formed in simple cases by other electrical circuit configurations, wherein raw signal data can be directly compared with envelope data in identical frequency ranges.

The charge component which is filtered out as a function of the predefined frequency is accumulated in the charge storage means. For this purpose, the charge storage means is connected to the electrical filter. The charge storage means therefore sums over time the charges generated by the piezoelectric film and selected by the filter. The value of the charges on the charge storage means is therefore a measure of the occurrence of certain vibrations on the monitored component, to which the film is attached. As soon as a predefined charge limit value is achieved on the charge storage means, an electrical signal is generated by means of a signaling means. The frequency-selective energy yield per unit of time delivers valuable information even as a history value. If it is compared for multiple identically designed assemblies, then other more detailed statements can be made about the machine condition. In a particularly advantageous design this variable is then also expressed in terms of the power of the machine. By means of the structure described, energy is thus accumulated on the charge storage means over time. In certain embodiments, the energy consumption of the detector can be used as a variable for a constant level under normal vibration, so that the charge limit on the charge store is only reached in the event of unexpected vibration levels.

This structure can be used advantageously to implement a sensor which can continuously deliver values relating to occurring vibrations, is inexpensive to produce, has a simple design and above all, can be used in restricted spaces. The evaluation of the detected vibrations allows, to an extent previously unavailable, specific conclusions to be drawn as to the component state of a machine and thus to possible damage due to wear, material failure or assembly error.

In a first preferred embodiment the detector arrangement comprises a plurality of different electrical filters. To detect vibrations of both high and low frequencies, one of the filters is preferably designed as a high-pass filter, one as a band-pass and one as a low-pass. High-pass filters are usually designed to filter out frequencies above a cutoff frequency, while low-passes normally filter out frequencies below a cutoff frequency. The band-pass, on the other hand, has a range between a lower and an upper cutoff frequency in which frequencies are filtered out. By combining these filters a detector arrangement is provided which can be used in a wide range of applications at different frequencies. For the accumulation of the filtered charge components, the detector arrangement has one charge store per filter, and one signaling means per charge store. The detector arrangement is not only characterized by a versatile range of uses in completely different frequency ranges, but the number of the filtered frequencies is also variable. For example, information about the frequency and intensity of occurring vibrations can be collected.

The detector arrangement is suitable for detecting a specified frequency range, in such a way that only one of the signaling means is designed to generate a signal when a predetermined charge limit is reached on the charge storage means. The charge that is not used in order to reach the specified charge limit can be used as an activation charge for the signaling means. Therefore a detector arrangement is provided, which in an advantageous way can supply its own energy. A portion of the occurring mechanical vibrations in a preferred embodiment is therefore used to generate the supply energy for the arrangement by means of the piezoelectric film, and to store it temporarily in appropriate storage means, and another portion of the occurring mechanical vibrations is used to fill the charge storage means, which generates a signal when the charge limit is reached in order to signal the occurrence of undesirable operating conditions. The detector arrangement can thus be permanently operated in a maintenance-free manner so that its application on rotating components is possible. In the simplest case, passive filter elements are used, which do not need any operating power. If active filter circuits are used, the operating power can come either from an external power supply, or else by using the charge provided by the piezoelectric film. In the latter case, it is preferable to use the charge components that do not result from the vibration to be monitored, so as not to distort the stored values on the charge storage means, i.e. the measuring result.

In a preferred refinement the detector arrangement is suitable for detecting multiple frequency ranges at once, if a plurality of the signaling means are designed to generate electrical signals when a predetermined charge limit is reached on the charge storage means. In this operating mode, a majority of the piezoelectrically generated charge is passed to the charge storage means in order to reach the predetermined limit. It may then be the case that the charge which is not used to reach the predefined charge limits is no longer available in sufficient quantity to generate signals on the signaling means. In this case, it is necessary for the detector arrangement to have a frequency-independent energy source, which can be arranged on the film or outside of it. The energy source can be attached to the film or it can be integrated into the structure of the film. The energy source is formed for example as a battery, a solar cell or an electricity supply outlet. Other frequency-independent energy sources are conceivable. For example, the supply outlet can be connected to a battery, a solar cell or another piezoelectric element. A storage medium can be arranged on the film for storing a frequency-independently generated charge. The energy required to operate the signaling means is provided in this way. The storage medium is mounted on the film or can be integrated into the structure of the film or arranged outside the film.

In a preferred embodiment the signaling means of the detector arrangement is designed for the wireless transmission of the electrical signal to a signal receiver. The signal is preferably in the form of an electrical pulse. The signal receiver is preferably implemented as a pulse counter. The signal receiver can be arranged, for example, to be separate from the detector arrangement. The separate arrangement is particularly suitable if the signal is transmitted from a rotating to a fixed component. In the simplest case, an optical signal is generated, which can be perceived by an operator as an alarm signal.

With fixed components it is more appropriate to integrate the signal receiver into the detector arrangement, which represents a more preferred embodiment. In the integrated design, it is preferable also to integrate an evaluation unit that can be connected to the signal receiver into the detector arrangement. The evaluation unit can preferably be connected to further signal receivers for detecting additional signals and is used to evaluate the at least one recorded signal. The continuous evaluation enables conclusions to be drawn about the condition of the component and can reveal damage to components or impairments in component functions at an early stage.

In a preferred embodiment the film is made of polyvinylidene fluoride (PVDF), a transparent semi-crystalline thermoplastic. To produce the piezoelectric characteristics, PVDF is polarized by mechanical stretching under exposure to a strong directed electromagnetic field to align the dipoles. The standard technique for attaching electrodes is to apply a metallic coating to piezoelectric films. The metallic coating used usually consists of materials evaporated onto the film, such as gold-nickel or copper-nickel alloys. In later use, the charge separation which is proportional to the force is tapped off from these electrodes as an electrical measurement signal. It is also possible, to provide the PVDF film with conductor tracks on its upper and lower sides. It is also possible to design the film itself as an electrically conductive film.

Bonding procedures are a particularly advantageous way of attaching the film to the component. Another possible method is an additional encapsulation of the film by casting, to obtain for example an improved protection against any kind of environmental influences, or to minimize the risk of sources of ignition in an explosive atmosphere.

In a preferred embodiment the film has a plurality of the piezoelectric elements, which can be formed in separate sections of the film. This means, for example, that vibrations can be detected which occur in different propagation directions on the component. In a further preferred embodiment, a plurality of the piezoelectric elements are arranged as a stack in order to increase the measurement sensitivity.

BRIEF DESCRIPTION OF THE DRAWINGS

A preferred embodiment is described in greater detail below on the basis of the enclosed drawing.

The single FIGURE shows a schematic representation of the structure of a detector arrangement 01 for selectively detecting vibrations on a component.

DETAILED DESCRIPTION

The detector arrangement 01 can be attached to a component (not shown), a machine element or similar. The detector arrangement 01 comprises a piezoelectric film 02.

The film 02 is formed with at least one piezoelectric active element or it has piezoelectrically active properties itself and is designed to produce a charge, wherein the charge is produced at a frequency that is correlated with a mechanical vibration occurring on the component. For example, the charge is tapped off up via a connection electrode on the film or is forwarded by conductors integrated in the film.

On the film 02 in the example shown, three electrical filter 03 are arranged, one of which is implemented as a high-pass, one as a low-pass and one as a band-pass, which filter out frequencies from predefined frequency ranges. The electrical filters 03 are connected to the connection electrode (not shown) for collecting the charge.

In the example illustrated the detector arrangement 01 additionally comprises three charge storage means 05, which are arranged on the film 02 in such a way that the input of each charge storage means 05 is wired to one of the electrical filters 03. The charge storage means 05 are wired at their output to a signaling means 06. Hence an electrical filter 03, a charge storage means 05 and a signal means 06 form a series circuit arrangement.

The charge storage means 05 stores the charge component generated by the piezoelectric element and then filtered out according to a predefined frequency. As soon as a predetermined charge limit is reached on the charge storage means 05, the signaling means 06 triggers an electrical pulse in the form of a radio signal. The impulse is transmitted wirelessly to a signal receiver 07. The signal receiver 07 is designed to receive different signals from different filters 03. The signal receiver 07 is connected to an evaluation unit 08 for transmitting the received signals. The evaluation unit 08 is designed to capture and process the signals provided by the signal receiver 07, and to output the processed signals. The evaluation unit has an output interface 09 for this purpose. The evaluation unit 08 also has a recording interface 10 for recording and processing additional signals, which are transmitted for example from a remote control unit (not shown) to the evaluation unit 08. The output interface 09 is designed to output different signals.

The schematic representation shows that an energy source 12 is arranged on the film 02, which is designed to supply operating energy in a frequency-independent manner. The energy source 12 is attached to the film 02 or is integrated into the structure of the film 02. The energy source can be formed for example as a battery, a solar cell or an electricity supply outlet. For example, the supply outlet can be connected to a battery, a solar cell or another piezoelectric element. In other embodiments the energy source can be omitted, since energy is supplied autonomously by the film 02.

For the temporary storage of the frequency-independently generated energy, a storage medium 13 is arranged on the film 02. The storage medium 13 is connected to the energy source 12 and the individual filters 03 and designed for supplying operating energy to the filters 03. The storage medium 13 is attached to the film 02 or integrated into the structure of the film 02.

LIST OF REFERENCE NUMERALS

01 detector arrangement
02 piezoelectric film
03 electrical filter
05 charge storage means
06 signaling means
07 signal receiver
08 evaluation unit 09 output interface
10 receiving interface
12 energy source
13 storage medium

The invention claimed is:

1. A detector assembly for the selective detection of vibrations on a component, comprising:
a film fitted with at least one piezoelectric element, said film being attached to the component in such a way that occurring mechanical vibrations act on the piezoelectric element, such that an electrical charge with a frequency correlating with the mechanical vibration is generated at connection electrodes of the piezoelectric element;
an electrical filter which is connected to the piezoelectric element and filters out a component of the supplied charge which corresponds to a predefined frequency;
a charge storage means, connected to the electrical filter, which accumulates the filtered-out charge component; and
a signaling means, which generates an electrical signal as soon as a predetermined charge limit value is achieved at the charge storage means.

2. The detector arrangement of claim 1 further comprising two additional electrical filters, two additional charge storage means, and two additional signaling means, wherein the three electrical filters include a low-pass filter, a high-pass filter and a band-pass filter, wherein a separate charge storage means and a separate signaling means is assigned to each electrical filter.

3. The detector arrangement of claim 1 wherein the electrical filter, the charge storage means and the signaling means are an integral part of the film.

4. The detector arrangement of claim 1 further comprising an independent energy source for supplying the electrical filters with operating energy.

5. The detector arrangement of claim 1 wherein the signaling means is designed for the wireless transmission of the electrical signal to a remote signal receiver.

6. The detector arrangement of claim 5 wherein the electrical signal is formed as an electrical pulse and the signal receiver is designed as a pulse counter, wherein the signal receiver is coupled with an evaluation unit for evaluating the detected signal.

7. The detector arrangement of claim 1 wherein the charge storage means is a capacitor integrated into the film.

8. The detector arrangement of claim 1 wherein the film is formed of polyvinylidene fluoride (PVDF).

9. The detector arrangement of claim 1 wherein the film is bonded to the component by an adhesive layer.

10. The detector arrangement of claim 1 wherein the film, the filter and the charge storage means are encapsulated in a common casting compound.

11. A detector assembly for the selective detection of vibrations on a component, comprising:
a film fitted with a piezoelectric element adapted for mechanical attachment to the component;
a plurality of electrical filters including a low-pass filter, a band-pass filter, and a high-pass filter;
a plurality of charge storage means, each connected to a respective electrical filter of the plurality of electrical filters, which accumulate the filtered-out charge component; and
a plurality of signaling means, each of which generates an electrical signal as soon as a predetermined charge limit value is achieved at a corresponding charge storage means.

12. The detector arrangement of claim 11 further comprising an independent energy source for supplying the electrical filters with operating energy.

13. The detector arrangement of claim 11 wherein the plurality of signaling means wirelessly transmits signals to a remote signal receiver.

14. The detector arrangement of claim 13 wherein the signal receiver is a pulse counter, and wherein the signal receiver is coupled with an evaluation unit.

15. A detector assembly for the selective detection of vibrations on a component, comprising:
a film fitted with a piezoelectric element adapted for mechanical attachment to the component;
a plurality of electrical filters including a low-pass filter, a band-pass filter, and a high-pass filter;
a plurality of capacitors, each connected to a respective electrical filter of the plurality of electrical filters, which accumulate the filtered-out charge component; and
a plurality of signal generators, each of which generates a signal in response to a corresponding capacitor exceeding a predetermined charge limit value.

16. The detector arrangement of claim 15 further comprising an independent energy source for supplying the electrical filters with operating energy.

17. The detector arrangement of claim 16 wherein the independent energy source is an additional piezoelectric element.

18. The detector arrangement of claim 15 wherein the plurality of signal generators wirelessly transmits signals to a remote signal receiver.

19. The detector arrangement of claim 18 wherein the signal receiver is a pulse counter, and wherein the signal receiver is coupled with an evaluation unit.

* * * * *